United States Patent [19]

Nakajima et al.

[11] Patent Number: 4,651,693
[45] Date of Patent: Mar. 24, 1987

[54] SWIRL CONTROL ARRANGEMENT FOR INTERNAL COMBUSTION ENGINE

[75] Inventors: Yasuo Nakajima; Tooru Yoshimura; Katsunori Terakasa, all of Yokosuka, Japan

[73] Assignee: Nissan Motor Company, Ltd., Japan

[21] Appl. No.: 848,565

[22] Filed: Apr. 7, 1986

[30] Foreign Application Priority Data

Apr. 9, 1985 [JP] Japan .............................. 60-52453[U]

[51] Int. Cl.⁴ .............................................. F02B 31/00
[52] U.S. Cl. ..................................................... 123/306
[58] Field of Search ................... 123/188 M, 306, 308

[56] References Cited

U.S. PATENT DOCUMENTS 4,428,334 1/1984 Klomp ............................. 123/188 M
4,467,750 8/1984 Isogai ..................................... 123/306
4,470,391 9/1984 Ishida .................................... 123/306

FOREIGN PATENT DOCUMENTS 57-102516 6/1982 Japan ..................................... 123/306

Primary Examiner—Ronald B. Cox
Attorney, Agent, or Firm—Lowe, Price, LeBlanc, Becker & Shur

[57] ABSTRACT

In order to accurately control the operation of the engine while still achieving near optimal swirl rate control, the swirl is controlled by a valve which is separate from the engine throttle valve and which is basically controlled in response to the pressure prevailing across the same. Various operating parameters such as the instant air-fuel ratio of the charge being combusted in the combustion chambers are utilized to modify prerecorded values to those which will induce the best setting for the valve.

6 Claims, 11 Drawing Figures

SWIRL CONTROL ARRANGEMENT FOR INTERNAL COMBUSTION ENGINE

BACKGROUND OF THE INVENTION

1. Field of the Present Invention

The present invention relates generally to an internal combustion engine and more specifically to a control arrangement for an internal combustion engine having a swirl generating arrangement incorporated therewith.

2. Description of the Prior Art

FIGS. 1 to 4 show an example of a prior art swirl control arrangement disclosed in Japanese Patent Application First Provisional Publication No. 57-102516. This arrangement is adapted for use with an internal combustion engine 1 wherein each combustion chamber 2 is equipped with two inlet valves 3a, 3b and two exhaust valves 4a, 4b. As shown in FIG. 1 each of the inlet valves 3a, 3b communicates with a collector 5 of an induction system 6 via runners 7 in which discrete induction passages 8, 9 are formed.

In this engine the induction system 6 is equipped with a sliding throttle valve arrangement 10 which includes an arrangement via which the swirl generated in the combustion chambers is controlled.

The valve member or element 12 of the sliding throttle valve 10 is arranged to be movable between a fully open position such as shown in FIG. 2 to a fully closed one such as shown in FIG. 4. Between these two extreme positions the valve member may assume a partially open position such as shown in FIG. 3.

As will be appreciated, in the fully open position (FIG. 2) both of the induction passages 8, 9 via which each combustion chamber 2 receives fresh charge are wide open. However, as the valve member 12 moves to a position close to the fully closed one the amount of air which is permitted to flow through the induction passages 8,9 is throttled and thus tends to increase the velocity of air which is directed toward the combustion chambers 2 a manner which promotes the formation of a strong swirl at low throttle settings.

However, this arrangement has suffered from the drawbacks that it is difficult to match the required swirl control with the control of the optimum air-fuel ratio under such conditions and in that during low throttle settings the pressure differential across the valve member 12 produces a force of sufficient magnitude as to induce jamming of the same.

To overcome the latter mentioned problem it is possible to increase the clearance between the valve member 12 and the rack 14 in which it is slidably disposed sufficiently to lower the pressure differential which develops across the valve member 12 to the point where the sticking phenomenon does not occur. However, this technique renders control of the minimum amount of air which can enter the combustion chambers very difficult and has not proven to be a succeful solution to the problem.

SUMMARY OF THE INVENTION

It is an object of the present invention to provide a swirl generating arrangement for an internal combustion engine which can achieve the desired matching of the appropriate swril generation with the instant mode of engine operation without loss of air-fuel control and vice versa.

In brief, in order to achieve the above object the swirl is controlled by a valve which is separate from the engine throttle valve and which is basically controlled in response to the pressure prevailing across the same. Various operating parameters such as the instant air-fuel ratio of the charge being combusted in the combustion chambers are utilized to modify predetermined valve settings to determine the best setting for the valve for the given set of operating conditions.

More specifically, the present invention takes the form of an internal combustion engine having a combustion chamber and an induction system which is characterized by: an induction passage leading to the combustion chamber; means for forming and air fuel mixture in the combustion chamber; an inlet valve which controls communication between the combustion chamber and the induction passage; a throttle valve disposed in the induction passage for controlling the amount of air which is inducted into the combustion chamber when the inlet valve is open; a swirl control valve disposed in the induction passage downstream of the throttle valve; a first sensor for sensing the pressure differential between the section of the induction passage upstream of the swirl control valve and the section of the induction passage downstream of the swirl control valve; a second sensor for sensing the air-fuel ratio of the air-fuel mixture being combusted in the combustion chamber; a servo for controlling the position of the swirl control valve; and a control circuit responsive to the first and second sensors for controlling the servo in a manner to optimize the swirl generation within the combustion chamber for the air-fuel ratio of the air-fuel mixture being combusted in the combustion chamber.

DESCRIPTION OF THE PREFERRED EMBODIMENT

Figure 1:
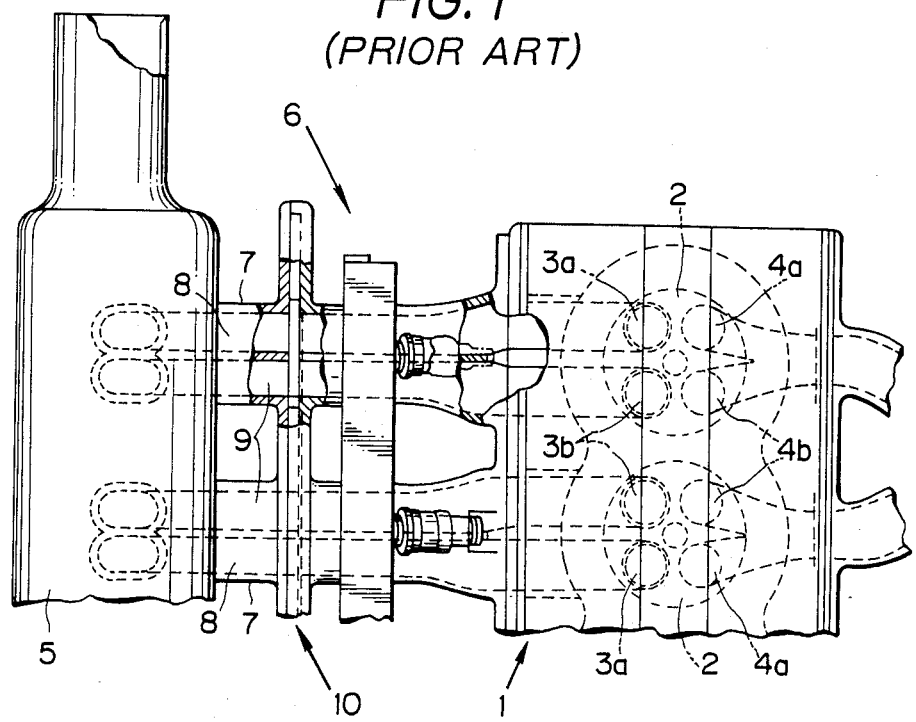
FIGS. 1 to 4 show the prior art arrangements discussed in the opening paragraphs of the instant disclosure.
Figure 2:
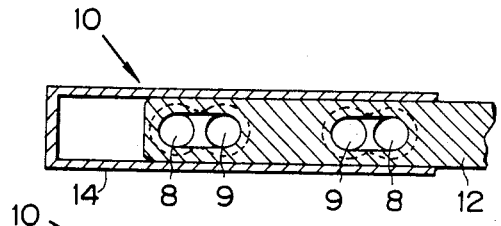
Figure 3:
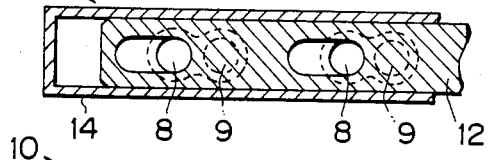
Figure 4:
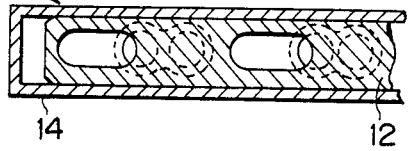

Turning to FIG. 1 the basic arrangement of the present invention is shown in schematic form. As will be appreciated with the present invention the throttle valve and the swirl control valve are separated into individual emements. This permits individual control of the engine throttling and swirl control functions and simultaneously reduces the magnitude of the pressure differential which develops accross the swirl generating valve element hence obviating any tendancy for jamming of sliding valve member to occur.

Figure 11:
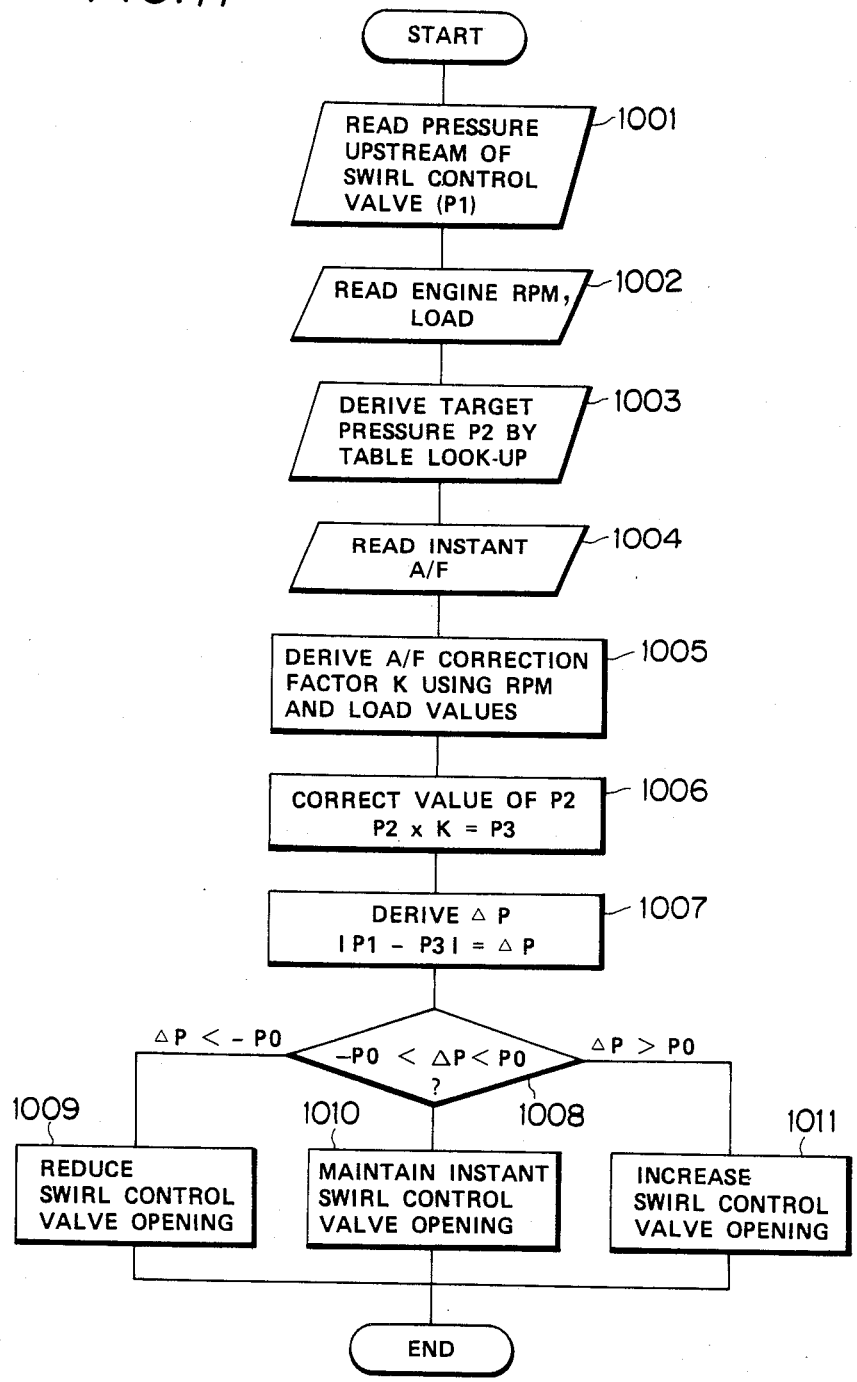
FIG. 11 is a flow chart depicting the control steps which are executed during operation of an embodiment of the present invention.

According to the present invention the control of the swirl generating valve is basically developed around the pressure differential which prevails across the swirl generating valve. That is to say, the opening degree of the swirl generating valve 100 is controlled by a servo 102 which is responsive to a control arrangement which includes a sensor 104 for sensing the pressure differential existing across ports 106 and 108 and a control circuit 110 which is responsive to the sensed pressure differential and to a plurality of engine operational parameter inputs. In this embodiment the control circuit 110 receives, in addition to the pressure differential signal, data indicative of engine speed, engine load, the air-fuel ratio of the air-fuel mixture being combusted in the combustion chambers and the temperature of the engine coolant (see FIG. 9). This data is utilized in determining the best setting for the swirl control valve 100 as will become clear hereinlater when a discussion of the flow chart shown in FIG. 11 is made.

As will be apparent to one skilled in the art of automotive engineering, the engine speed signal may derived by tapping the ignition system of the engine or using the frequency of a fuel injection control signal while the output of an air-flow meter or vacuum pressure sensor may be used to indicate engine load. The air/fuel ratio can be derived by suitably dividing the output of an air-flow meter with a signal indicative of the amount of fuel being fed to the engine—such as the width of a fuel injection control pulse signal.

In the embodiment disclosed in this specification the throttle valve 120 takes the form of a butterfly valve disposed in an upstream section of the induction manifold arrangement 122 while the swirl control valve takes the form of a sliding valve arrangement 124. The throttle valve 120 is conventionally controlled by a suitable linkage or servo arrangement operatively connected with a manually operable accelerator pedal or like control element.

Figure 8:
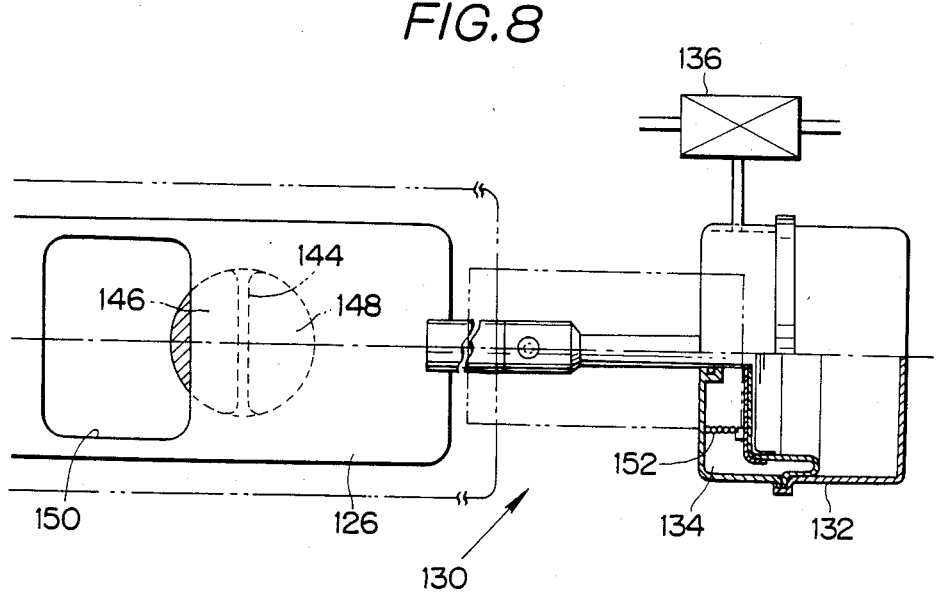

The sliding swirl control valve element 126 is controlled by a servo device 130 which includes pneumatic motor 132. This motor can be operated either on vacuum or positive pressure. In the instant embodiment the motor is operated on vacuum which as shown in FIG. 8 is supplied to vacuum chamber 134 via a solenoid valve 136. The pressure in the pressure chamber is controlled by varying the duty cycle of the signal via which the solenoid is energized in a manner which modulates the amount of vacuum and atmospheric air fed to the chamber 134.

Figure 7:
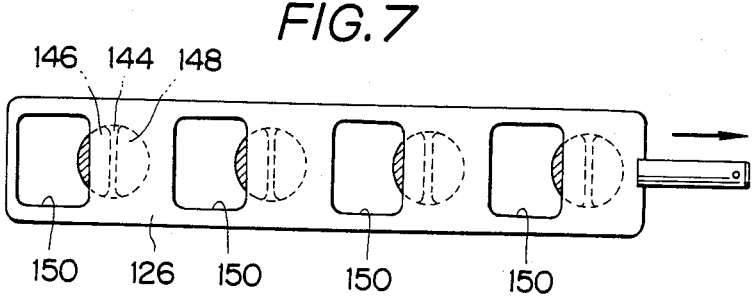
FIGS. 7 and 8 show a sliding valve member which is utilized in the first embodiment of the present invention.

As best seen in FIG. 7 the sections of manifold runners 140 downstream of the swirl control valve arrangement 124 and the corresponding induction ports which lead to the combustion chambers 142 are arranged, in this embodiment, to be partitioned by a wall section 144 in a manner to define two hemi-cylindrical cross-section passages 146, 148. The valve element 126 of the sliding valve is provided with essentially rectangular appertures 150 and is reciprocatively disposed in a casing arrangement formed in the manifold.

In FIG. 7 the sliding valve member 126 is shown in its maximum throttling position wherein the air flowing through the induction passage is accelerated to its maximum velocity. In this position the maximum swirl generation is achieved.

As the magnitude of the vacuum supplied to the pressure chamber of the servo motor is selectively decreased the valve member 126 is permitted to slide under the influence of return spring 152 in a manner which firstly increases the opening through which air may enter passage 146 and subsequently begins opening passage 148. It will be noted the rate at which the opening of the second passage 148 is opened decreases as the valve member moves to ward a minimum swirl generating position.

Figure 6:
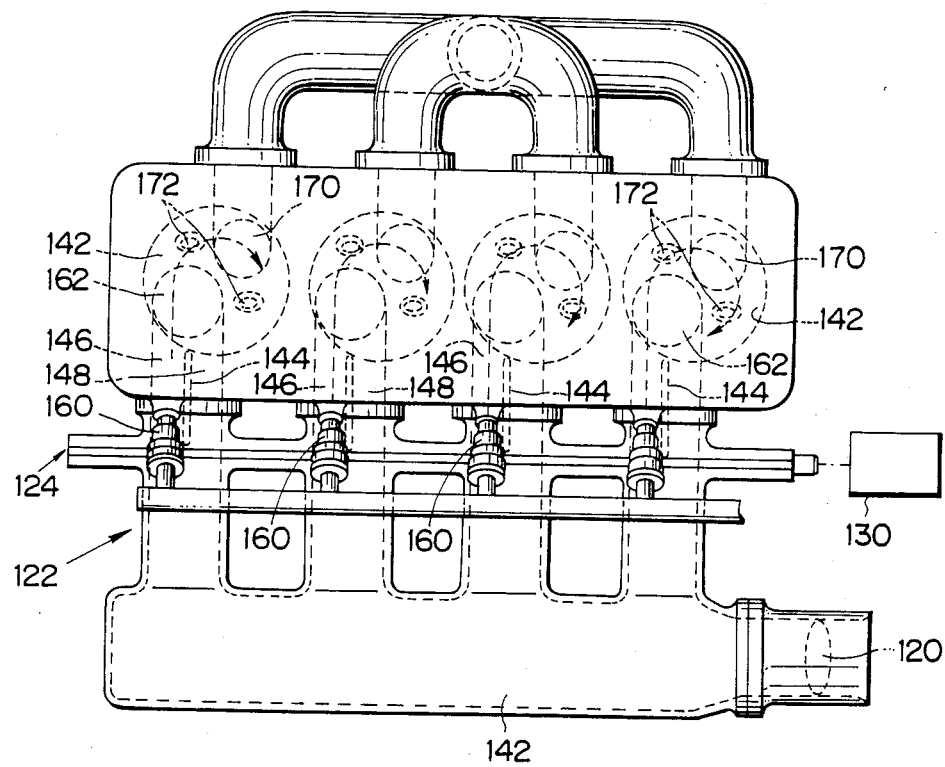
FIG. 6 shows in plan an example of an engine system incorporating an embodiment of the present invention.

In the induction system to which the present invention is applied the induction passages are arranged to introduce the flow which passes therethrough into the combustion chambers 142 in a manner to swirl thereabout as shown by the arrows in FIG. 6. As will also be apparent from FIG. 6 fuel injectors 160 are arranged to inject fuel into each of the passages 146 at locations downstream of the swirl control valve element 126 to take advantage of the relatively high velocity flow which occurs during low engine load operation.

As different from the prior art arrangement the engine to which the present invention is applied has only one inlet valve 162 per cylinder. The wall 144 which partitions passage 146 from passage 148 is arranged to terminate just upstream of an essentially opposite the stem of the inlet valve 162.

Accordingly, when valve element 126 is in the position shown in FIG. 7 the flow which passes through passage tends to pass over one side of the single large diameter inlet valve head and enter the combustion chamber 144 with a strong horizontal flow component. This latter mentioned feature of course tends to promote a swirl which will persist into the expansion stroke to promote good combustion. However, as the swirl control valve is opened the velocity of the flow introduced into the combustion chamber changes in a manner wherein the resulting swirl decreases in intensity. When the valve element 126 is moved to its fully open position very little or no swirl is produced in the combustion chambers.

Further features of the engine to which the present invention is applied come in that each combustion chamber is provided with only one exhaust valve 170 which is offset with respect to the inlet valve 162 and in that there are two spark plugs 172 per chamber. As shown in FIG. 6 the spark plugs are arranged in or near the path along which the flow from passages 146 follows in the combustion chamber.

It will however be fully appreciated the present invention is not limited to this particular type of inlet valve arrangement and may be applied to engines of the type shown in FIG. 1 of the drawings if so desired.

Figure 5:
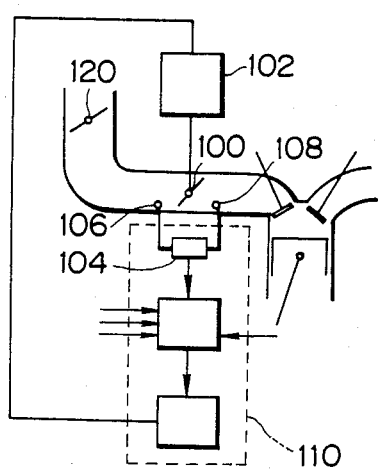
FIG. 5 shows in schematic block diagram form the basic layout of the instant invention.
Figure 9:
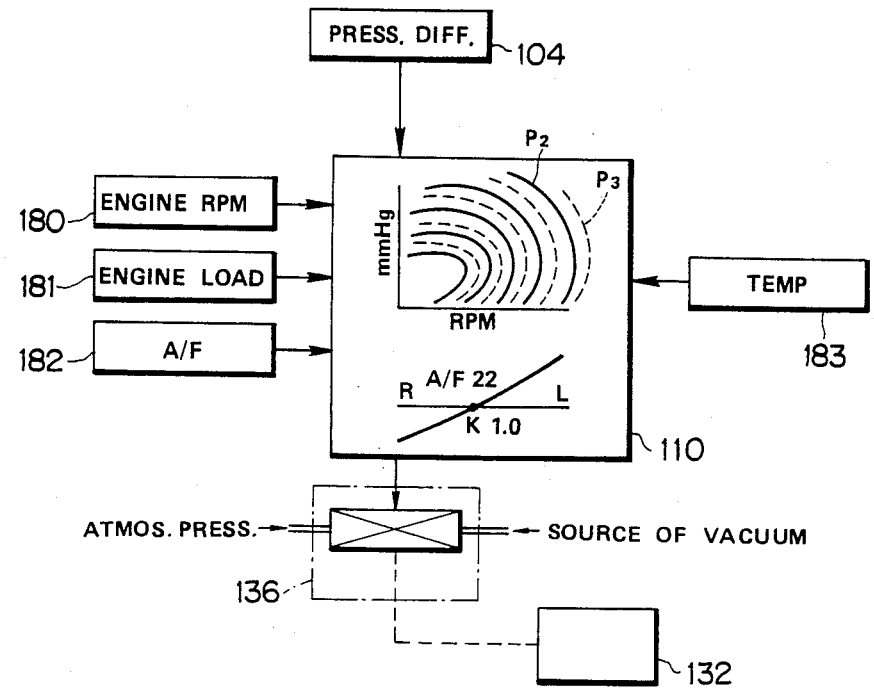
FIG. 9 is a block diagram showing the arrangement which characterises the control system of the embodiment of the present invention.

Although not shown specifically, it will be understood that the control circuit 110 shown in FIGS. 5 and 9 includes a microprocessor which includes a ROM, RAM, a CPU and one of more in/out interfaces I/O.

The ROM of this microprocessor contains predetermined control programs and tables via which the operation of the instant embodiment can be implemented.

FIG. 11 shows a flow chart depicting the steps which characterize the operation of a control routine set in the ROM of the above mentioned microprocessor.

In the first step (1001) of this control routine the outputs of the pressure differential sensor 104 is read and the instant value of the pressure differential which is prevailing across the swirl control valve 124 is temporarily stored in RAM. Subsequently at step 1002 the instant values of the engine speed and load are determined by sampling the outputs of sensors 180, 182 and stored in RAM. At step 2003 the optimal swirl generating pressure differential (P2) for the instant set of engine speed and load conditions is derived using a table look-up technique. An example of this type of table is given in the block which depicts the control circuit in FIG. 9.

As will be apparent to those skilled in the art of computer programming it is possible to prepare a plurality of two or three dimensional tables wherein the necessary predetermined control data is recorded in a form which enables the look-up of the required information to control the position of the swirl valve element 126 to that wherein the desired swirl rate for the instant set of engine operating conditions can be made.

Figure 10:
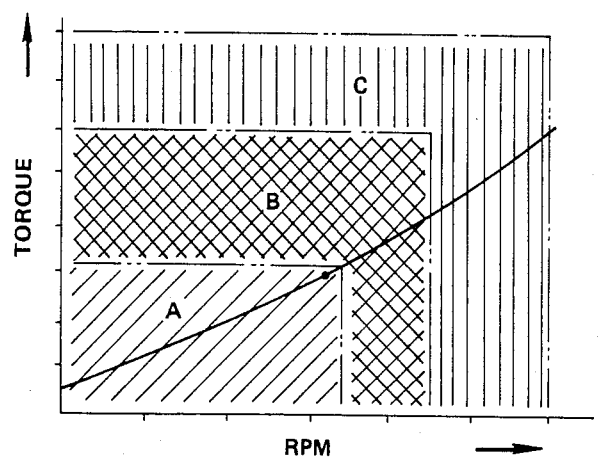
FIG. 10 is a drawing showing a table wherein torque and engine speed data are plotted against one and other and which is utilized in the control system of the present invention.

Following this the instant A/F ratio value is read and at step 1005 a correction factor K which, in view of the instant values of engine speed, load, temperature etc., will being the instant A/F ratio to that experimentally determined to be optimal for the instant set of operating conditions, is determined utilizing a table such as that shown in FIG. 10. This table is such as to be divided in three sections A, B and C. The first of these sections is, as shown, a low load/low speed zone wherein for the sake of fuel economy the optimal air-fuel ratio is set lean at a value of 22:1 by way of example, the second (zone B) is such as to meet a both power and ecomomy requirements and thus the optimum air fuel ratio is deemed to be approximately stoichiometric while the air fuel ratio of zone C is set rich (eg. 12:1 to 13:1) for high power output.

Thus, for example if the engine is operating under light load at low engine speed, then it is determined that the most suitable air fuel ratio for the instant set of operating conditions is 22:1.

At step 1006 the value of P2 derived in step 1003 is modified using correction factor K in a manner to derive a corrected pressure value P3. This value as will be appreciated is such as to maintain the air fuel ratio at that best suited for the instant set of conditions.

At step 1007 the absolute difference between the instant pressure differential P1 and that derived in step 1006 (viz., P3) is obtained. This value is ranged in step 1008. In the event that the derived difference is out of a permissible range of —P0 to +P0, the opening degree of the swirl control valve 124 is varied by varying the duty cycle of the signal being applied to the solenoid valve 132 in a manner to being said difference within the just mentioned range.

Although the instant disclosure has been given in conjunction with an arrangement wherein a sliding valve arrangement is used to control the swirl produced in the combustion chambers, it is within the scope of the present invention to use a valve of a different nature such as a butterfly type valve or the like.

The above described embodiment is illustrative of the invention which may be modified with the scope of the appended claims.

What is claimed is:

1. In an internal combustion engine having a combustion chamber;
   an induction system comprising:
   an induction passage leading to the combustion chamber;
   means for forming and air fuel mixture in one of said combustion chamber and said induction passage;
   an inlet valve which controls communication between said combustion chamber and said induction passage;
   a throttle valve disposed in said induction passage for controlling the amount of air which is inducted into said combustion chamber when said inlet valve is open;
   a swirl control valve disposed in said induction passage downstream of said throttle valve;
   a first sensor for sensing the pressure differential between the section of said induction passage upstream of said swirl control valve and the section of said induction passage downstream of said swirl control valve;
   a second sensor for sensing the air-fuel ratio of the air-fuel mixture being combusted in the combustion chamber;
   a servo for controlling the position of said swirl control valve; and
   a control circuit responsive to said first and second sensors for controlling said servo in a manner to optimize the swirl generation within the combustion chamber for the air-fuel ratio of the air-fuel mixture being combusted in said combustion chamber.

2. An induction system as claimed in claim 1, wherein said swirl control valve takes the form of a sliding valve comprised of a flat valve element reciprocatively disposed in a rack, said valve element being formed with an aperture through which air flows; said valve element being operatively connected with said servo to be moved in said rack in a manner that said aperture is selectively moved to a position with respect to said induction passage wherein a throttling effect is produced which accelerates the flow of air passing through said induction passage.

3. An induction system as claimed in claim 1, wherein said air-fuel mixture forming means takes the form of a fuel injector which is arranged to inject fuel into said induction passage at a location downstream of said swirl control valve.

4. An induction system as claimed in claim 1, further including:
   a third sensor for sensing the rotational speed of the engine;
   a fourth sensor for sensing the load on said engine; and
   a fifth sensor for sensing a temperature which varies with the temperature of the engine;
   said control circuit containing means responsive to said first, second, third, fourth and fifth sensors for:
   determining the pressure differential which, if induced between said upstream and downstream sections of said induction passage, will produce the optimal swirl for the instant set of operating conditions;
   determining a correction factor which will bring the instant air-fuel mixture to a value deemed optimal for the instant set of operating conditions;
   modifying the value of determined pressure differential using said correction factor to determine a target pressure diffential and outputting a control signal to said servo which will cause said swirl control valve to assume a position wherein the instant pressure differential will be changed toward the target value.

5. A method of operating an internal combustion engine comprising the steps of:
   forming an air fuel mixture in one of an induction conduit leading to a combustion chamber of the engine or in the combustion chamber;
   controlling the amount of air which passes through said induction passage using a throttle valve;
   inducing a swirl in said combustion chamber by introducing the flow of fluid which flows through said induction passage into said combustion chamber in a predetermined manner;

controlling the intensity of the swirl using a swirl control valve which is disposed in said induction passage between said combustion chamber and said throttle valve;

controlling the position of said swirl control valve using a control circuit which is responsive to the pressure differential which prevail between the section of said induction passage upstream of said swirl control valve and the section of said induction passage downstream of said swirl control valve.

6. A method as claimed in claim 5, further comprising the steps of:

sensing the air-fuel ratio of the air-fuel mixture being combusted in said combustion chamber;

sensing the rotational speed of the engine;

sensing the load on said engine;

sensing a temperature which varies with the temperature of said engine;

deriving a pressure differential value which, if induced between said upstream and downstream sections of said induction passage, will induce the optimal swirl rate in said combustion chamber;

deriving a correction factor which will bring the instant air-fuel ratio to a value predetermined to be suitable for the instant set of operating conditions;

modifying the derived pressure differential using said correction factor;

using the modified pressure differential as a target value; and controlling the position of said swirl control valve in a manner which varies the pressure differential prevaling thereacross toward said target value.

* * * * *